(12) United States Patent
Akiyama

(10) Patent No.: US 8,020,267 B2
(45) Date of Patent: *Sep. 20, 2011

(54) PRECISION ROLL TURNING LATHE

(75) Inventor: Takanobu Akiyama, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 15 days.

This patent is subject to a terminal disclaimer.

(21) Appl. No.: 11/739,884

(22) Filed: Apr. 25, 2007

(65) Prior Publication Data

US 2007/0251360 A1 Nov. 1, 2007

(30) Foreign Application Priority Data

Apr. 27, 2006 (JP) ................. 2006-123626

(51) Int. Cl.
*B23P 23/02* (2006.01)
*B23B 29/24* (2006.01)
*B23Q 15/14* (2006.01)

(52) U.S. Cl. ............... 29/40; 29/55; 82/121; 82/159; 82/129

(58) Field of Classification Search ............ 82/121, 82/123, 124, 131, 132, 137, 139, 153, 154, 82/159, 142, 148; 29/39, 40, 55, 27 C; 408/35
See application file for complete search history.

(56) References Cited

U.S. PATENT DOCUMENTS

| | | |
|---|---|---|
| 1,417,521 A | 5/1922 | Haumann |
| 1,949,512 A | 3/1934 | Norton |
| 2,028,293 A | 11/1936 | OBrien et al. |
| 2,222,206 A | 11/1940 | Stone et al. |
| 2,354,411 A | 7/1944 | Thompson |
| 2,378,261 A | 6/1945 | Turney |
| 2,534,333 A | 12/1950 | Wyrick |
| 2,559,138 A | 7/1951 | Waterson |
| 2,682,698 A | 7/1954 | Berthiez |
| 2,760,397 A | 8/1956 | Arpon |
| 3,017,697 A | 1/1962 | Wlodek |
| 3,125,931 A | 3/1964 | Stanaback |
| 3,159,065 A | 12/1964 | Diener |
| 3,449,985 A | 6/1969 | Eaves et al. |
| 3,703,112 A | 11/1972 | Selby |

(Continued)

FOREIGN PATENT DOCUMENTS

CN 2541118 3/2003

(Continued)

OTHER PUBLICATIONS

Office Action issued in counterpart Korean Application No. 10-2007-0040936, mailed Mar. 27, 2008.

(Continued)

*Primary Examiner* — Boyer D Ashley
*Assistant Examiner* — Sara Addisu
(74) *Attorney, Agent, or Firm* — DLA Piper LLP US

(57) ABSTRACT

A roll turning lathe is provided herein which can not only machine with high precision circumferential transverse grooves in the peripheral surface of a roll but can also machine with high precision longitudinal grooves in the peripheral surface. The precision roll turning lathe includes a fly cutter spindle device and a tool post having a plurality of cutting tools that are mounted on a tool swivel. By selectively using the tool post and the fly cutter spindle device, high-precision machining of transverse grooves and longitudinal grooves on a roll-shaped workpiece.

8 Claims, 5 Drawing Sheets

U.S. PATENT DOCUMENTS

| | | | |
|---|---|---|---|
| 3,841,805 A | 10/1974 | Zalis | |
| 3,985,049 A | 10/1976 | Streckfus | |
| 3,996,454 A | 12/1976 | Froyd | |
| 4,225,273 A | 9/1980 | Womack | |
| 4,266,276 A | 5/1981 | Hayashi et al. | |
| 4,461,121 A * | 7/1984 | Motzer et al. | 451/5 |
| 4,617,503 A | 10/1986 | Davis | |
| 4,617,764 A | 10/1986 | Reibakh | |
| 4,766,788 A | 8/1988 | Yashiki et al. | |
| 4,833,764 A * | 5/1989 | Muller | 29/40 |
| 4,840,095 A | 6/1989 | Nussbaumer et al. | |
| 4,876,931 A | 10/1989 | Bertini | |
| 5,152,202 A * | 10/1992 | Strauss | 82/134 |
| 5,197,228 A | 3/1993 | Sharky et al. | |
| 5,222,283 A * | 6/1993 | Laschet | 29/27 C |
| 5,289,622 A | 3/1994 | Minagawa | |
| 5,946,991 A | 9/1999 | Hoopman | |
| 5,964,016 A * | 10/1999 | Ito et al. | 29/27 C |
| 6,040,653 A | 3/2000 | O'Neill | |
| 6,075,221 A | 6/2000 | Minhas | |
| 6,457,391 B1 | 10/2002 | Yamazaki et al. | |
| 6,865,789 B2 * | 3/2005 | Katoh et al. | 29/40 |
| 6,868,304 B2 | 3/2005 | Uehara et al. | |
| 6,945,147 B2 | 9/2005 | Sakashita | |
| 6,952,627 B2 | 10/2005 | Olczak et al. | |
| 7,089,836 B2 | 8/2006 | Kato et al. | |
| 7,240,412 B2 | 7/2007 | Sasazawa et al. | |
| 7,266,871 B2 * | 9/2007 | Takeuchi et al. | 29/27 C |
| 7,441,484 B1 | 10/2008 | Larsen | |
| 2002/0008899 A1 | 1/2002 | Tanaka et al. | |
| 2002/0082742 A1 | 6/2002 | Kadono | |
| 2004/0002690 A1 | 1/2004 | Miyamoto | |
| 2004/0045419 A1 | 3/2004 | Bryan | |
| 2004/0050222 A1 * | 3/2004 | Sakashita | 82/148 |
| 2007/0042160 A1 | 2/2007 | Nakajima | |
| 2007/0251360 A1 | 11/2007 | Akiyama | |
| 2007/0295175 A1 | 12/2007 | Akiyama | |

FOREIGN PATENT DOCUMENTS

| | | | |
|---|---|---|---|
| CN | 1491765 | | 4/2004 |
| CN | 1736659 | | 2/2006 |
| DE | 2935829 | | 8/1980 |
| EP | 0403842 | | 12/1990 |
| JP | 59-024943 | A | 2/1984 |
| JP | 01-177924 | A | 7/1989 |
| JP | 04-283003 | | 10/1992 |
| JP | 11033801 | A * | 2/1999 |
| JP | 2001-328002 | | 11/2001 |
| JP | 2002-079401 | | 3/2002 |
| JP | 2002-160133 | | 6/2002 |
| JP | 2002160133 | A * | 6/2002 |
| JP | 2002-346803 | | 12/2002 |
| JP | 2003-94239 | | 4/2003 |
| JP | 2004-223836 | | 8/2004 |
| JP | 2004-344916 | | 12/2004 |
| JP | 2004-345062 | | 12/2004 |
| JP | 2004-358624 | | 12/2004 |
| JP | 2005-022058 | | 1/2005 |
| JP | 2005-537944 | | 12/2005 |
| JP | 2006-130066 | | 5/2006 |
| JP | 2006-135560 | | 5/2006 |
| JP | 2006-156388 | | 6/2006 |
| JP | 2006-165144 | | 6/2006 |
| JP | 2006-166404 | | 6/2006 |
| JP | 2007-320022 | | 12/2007 |
| KR | 0251794 | | 4/2000 |
| SU | 1227375 | | 4/1986 |
| SU | 1227375 | A * | 4/1986 |
| SU | 1741981 | | 6/1992 |
| SU | 1815012 | | 5/1993 |
| WO | WO 2004-024421 | | 3/2004 |

OTHER PUBLICATIONS

English language abstract of JP 2002-160133, published Jun. 4, 2002.
English language abstract of JP 2005-022058, published Jan. 27, 2005.
English Language Translation of Korean Office Action dated Mar. 27, 2008, issued in counterpart Korean Application 10-2007-0040936.
Machine English language translation of JP 2002-160133, published Jun. 4, 2002.
Machine English language translation of JP 2005-022058, published Jan. 27, 2005.
Machine English language translation of JP 2003-94239, published Apr. 3, 2003.
Machine English language translation of JP 2004-358624, published Dec. 24, 2004.
Office Action issue in U.S. Appl. No. 11/762,524 mailed Sep. 18, 2008.
Office Action issued in U.S. Appl. No. 11/762,511 mailed Jan. 7, 2008.
Final Office Action issued in U.S. Appl. No. 11/762,511 mailed Sep. 5, 2008.
English Language Abstract of JP 2004-345062.
English Language machine translation of JP 2004-345062.
Advisory Action issued in U.S. Appl. No. 11/762,511 mailed Dec. 29, 2008.
Form PTO 892 issued in U.S. Appl. No. 11/762,511 on Dec. 16, 2008.
Office Action issued in U.S. Appl. No. 11/762,511 mailed Mar. 10, 2009.
Korean Offiice Action issued in Application No. 10-2007-0057853 mailed Dec. 12, 2008.
Translation of Korean Offiice Action issued in Application No. 10-2007-0057853 mailed Dec. 12, 2008.
English Language Abstract of JP 2001-328002.
English Language Abstract of JP 2002-079401.
Korean Offiice Action issued in Application No. 10-2007-0058393 mailed Dec. 12, 2008.
Translation of Korean Offiice Action issued in Application No. 10-2007-0058393 mailed Dec. 12, 2008.
English language machine translation of JP 2001-328002.
English language machine translation of JP 2002-079401.
Korean Offiice Action issued in Application No. 10-2007-0040936 mailed Dec. 12, 2008.
Translation of Korean Offiice Action issued in Application No. 10-2007-0040936 mailed Dec. 12, 2008.
Office Action issued in U.S. Appl. No. 11/762,524 mailed Apr. 16, 2009.
Chinese Office Action issued in Application No. 200710138844.2 mailed Feb. 27, 2009.
English Language Translation of Chinese Office Action issued in Application No. 200710138844.2 mailed Feb. 27, 2009.
English Language Abstract of CN 1736659.
Chinese Office Action issued in Application No. 200710138845.7 mailed Mar. 6, 2009.
English Translation of Chinese Office Action issued in Application No. 200710138845.7 mailed Mar. 6, 2009.
Office Action issued in Korean Application 10-2007-0057853 dated Oct. 19, 2009.
English Translation of Office Action issued in Korean Application 10-2007-0057853 dated Oct. 19, 2009.
English Language Abstract of KR 0251794 issued Apr. 15, 2000.
English Language Abstract of JP 2004-344916 published Dec. 9, 2004.
Machine translation of JP 2004-344916 published Dec. 9, 2004.
English Language Translation, of Chinese Office Action in CN Appl 2008-10090587.4 on Sep. 4, 2009.
Chinese Office Action in CN Appl 2008-10090587.4 on Sep. 4, 2009.
English Language Abstract of JP 2004-223836 published Aug. 12, 2004.
English Translation of Office Action issued in Korean Appl 10-2008-0031455 on Dec. 18, 2009.
Office Action issued in Korean Appl 10-2008-0031455 on Dec. 18, 2009.
English Abstract of JP Publication 04-283003 published Oct. 8, 1992.
English Abstract of JP Publication 2005-537944 published Dec. 15, 2005.
English machine translation of JP Publication 2005-537944 published Dec. 15, 2005.

English language abstract of JP 2006-130066, published May 25, 2006.
Machine English language translation of JP 2006-130066, published May 25, 2006.
English language abstract of JP 2006-135560, published May 25, 2006.
Machine English language translation of JP 2006-135560, published May 25, 2006.
English language abstract of JP 2006-156388, published Jun. 15, 2006.
Machine English language translation of JP 2006-156388, published Jun. 15, 2006.
English language abstract of JP 2006-165144, published Jun. 22, 2006.
Machine English language translation of JP 2006-165144, published Jun. 22, 2006.
English language abstract of JP 2006-166404, published Jun. 22, 2006.
Machine English language translation of JP 2006-166404, published Jun. 22, 2006.
U.S. Appl. No. 12/062,931 as of Oct. 30, 2010.
U.S. Appl. No. 11/762,511 as of Oct. 30, 2010.
Office Action issued in corresponding Japanese Application No. 2006-123626 on Sep. 10, 2010.
English translation of Office Action issued in corresponding Japanese Application No. 2006-123626 on Sep. 10, 2010.
English Language Abstract of JP 59-024943A, published Feb. 8, 1984.
English Language Abstract of JP 01-177924A, published Jul. 14, 1989.
Final Office Action issued in related U.S. Appl. No. 11/762,524, mailed Sep. 27, 2010.
Notice of Allowance issued in U.S. Appl. No. 11/762,511 on Jul. 30, 2010.
Amendment filed in U.S. Appl. No. 12/062,931 on Oct. 12, 2010.
U.S. Appl. No. 12/062,931 from Jan. 12, 2011 to May 12, 2011.
U.S. Appl. No. 11/762,524 from Jan. 12, 2011 to May 12, 2011.
Office Action issued in JP 2006-166404 on Mar. 29, 2011.
English Language Translation of Office Action issued in JP 2006-166404 on Mar. 29, 2011.
Image File Wrapper of U.S. Appl. 12/062,931 electronically captured Jun. 15, 2010.
Image File Wrapper of U.S. Appl. 11/762,511 electronically captured Jun. 15, 2010.
Image File Wrapper of U.S. Appl 11/762,524 electronically captured Jun. 15, 2010.
Image File Wrapper of U.S. Appl. 12/503,970 electronically captured Jun. 15, 2010.
Office Action issued in Korean Appl 10-2009-65152 on Mar. 30, 2011.
English Translation of Office Action issued in Korean Appl 10-2009-65152 on Mar. 30, 2011.
English Abstract of JP 2002-346803 published Dec. 4, 2002.
English Translation of JP 2002-346803 published Dec. 4, 2002.
English Abstract of JP 2007-320022 published Dec. 13, 2007.
English Translation of JP 2007-320022 published Dec. 13, 2007.

* cited by examiner

PRECISION ROLL TURNING LATHE

BACKGROUND OF THE INVENTION

1. Field of the Invention

The present invention relates to a precision lathe for carrying out machining of grooves on a roll, and more particularly to a precision roll turning lathe which can not only machine circumferential grooves in the peripheral surface of a roll but can also machine axial grooves in the roll surface with high precision.

2. Background Art

Roll grinders and roll turning lathes are generally used as machine tools for machining rolls. A roll grinder includes a headstock, a tail stock, and a carriage which is provided with a grinding wheel.

Such a roll grinder can carry out grinding with a grinding wheel of the peripheral surface of a roll and, in addition, machining of grooves in the peripheral surface. Japanese Patent Laid-Open Publication No. 2003-94239 describes a roll grinder which is provided, in its carriage, with a groove-machining device having a cutting saw blade for groove cutting.

A roll turning lathe is a lathe in which a tool post, having e.g. diamond tools attached thereto, is mounted in a carriage, and is basically used for machining circumferential grooves in a roll by rotating the roll with a headstock and feeding the carriage in the lateral direction (X-axis direction) of the roll. When machining axial grooves in a roll, the carriage is moved at a high speed in the longitudinal direction (Z-axis direction) of the roll while indexing the roll with the headstock (C axis), thereby producing the axial grooves.

The recent progress of control technology has realized ultraprecision machining with a lathe, and it has become possible to machine with a lather a mold for molding an optical lens. For example, the applicant has proposed a vertical lathe capable of machining a mold for molding of a Fresnel lens (Japanese Patent Laid-Open Publication No. 2004-358624). The vertical lathe can machine with high precision V-shaped lens grooves of a mold for molding of a Fresnel lens.

Owing to the widespread use of liquid crystal displays, there is an increasing demand for lens sheets for use in a backlight of a liquid crystal panel. Such lens sheets include, besides the above-mentioned Fresnel lens, a lenticular lens sheet, a cross lenticular lens sheet, a prism sheet, etc.

Molding a lenticular lens sheet, a cross lenticular lens sheet or a prism sheet by means of an extruder using roll-shaped mold has recently been studied.

When such a roll-shaped mold for molding of a lens sheet is machined by using a roll turning lathe, it is necessary to machine with precision circumferential grooves (transverse grooves) and longitudinal grooves in the peripheral surface of a roll.

Machining of the transverse grooves is carried out by feeding a diamond tool in the radial direction of the roll while rotating the roll at a high speed by means of the headstock of the lathe, as described above. Owing to the high-speed rotation of the roll, the vertical grooves can be machined at sufficiently high cutting speed, providing a good machined surface.

On the other hand, machining of the longitudinal grooves is carried out by feeding the carriage of the lathe in the longitudinal direction of the roll after indexing the roll with the headstock. Such machining involves the problem of insufficient cutting speed. It is to be noted in this regard that while an ideal cutting speed is about 300 m/min in the case of a roll plated with copper or nickel, the moving speed of a high-speed carriage would be about 10 m/min at most. Thus, a high-speed carriage, even when moved at the highest speed, will fail to afford cutting speed enough to provide a high-precision machined surface, in particular such an ultraprecision machined surface as required for a mold for molding a lens sheet.

SUMMARY OF THE INVENTION

It is therefore an object of the present invention to solve the above problems in the prior art and provide a precision roll turning lathe which can not only machine with high precision circumferential transverse grooves in the peripheral surface of a workpiece but can also machine with high precision longitudinal grooves in the peripheral surface. It is another object of the present invention to provide a precision roll turning lathe which can reduce thermal deformation of a sliding surface due to heat generated and can therefore perform higher-precision workpiece machining.

In order to achieve the above objects, the present invention provides a precision roll turning lathe comprising: a bed; a headstock, mounted on the bed, for rotating a workpiece while holding one end of the workpiece by means of a chuck, the headstock having an indexing axis (C axis) for performing circumferential indexing of the workpiece; a tail stock, mounted on the bed and disposed opposite the headstock, for rotatably supporting the other end of the workpiece; a carriage including a saddle mounted on the bed movably in the longitudinal direction (Z-axis direction) of the workpiece, and a table mounted on the saddle movably in a direction (X-axis direction) perpendicular to the longitudinal direction of the workpiece; a tool swivel mounted on the table and having an indexing axis (B axis); a tool post mounted on the tool swivel and having a plurality of cutting tools attached thereto; and a fly cutter spindle device mounted to the tool post and having a cutter spindle for rotating a fly cutter.

According to the present invention, by selectively using the tool post and the fly cutter spindle device, both mounted on the tool swivel, it becomes possible to carry out high-precision machining on a workpiece not only to produce transverse grooves (circumferential grooves) but to produce longitudinal grooves (axial grooves) as well.

When longitudinal grooves are machined with a machine that employs a roiling guide for guide of the carriage, Z-axis feeding of the carriage can be performed at a relatively low speed, whereby generation of heat in the guide surface of the Z-axis rolling guide can be reduced. This makes it possible to prevent the lowering of machining precision due to thermal deformation of the bed or the saddle while making use of the kinematic performance of the rolling guide.

DETAILED DESCRIPTION OF THE PREFERRED EMBODIMENTS

Preferred embodiments of the present invention will now be described with reference to the drawings.

Figure 1:
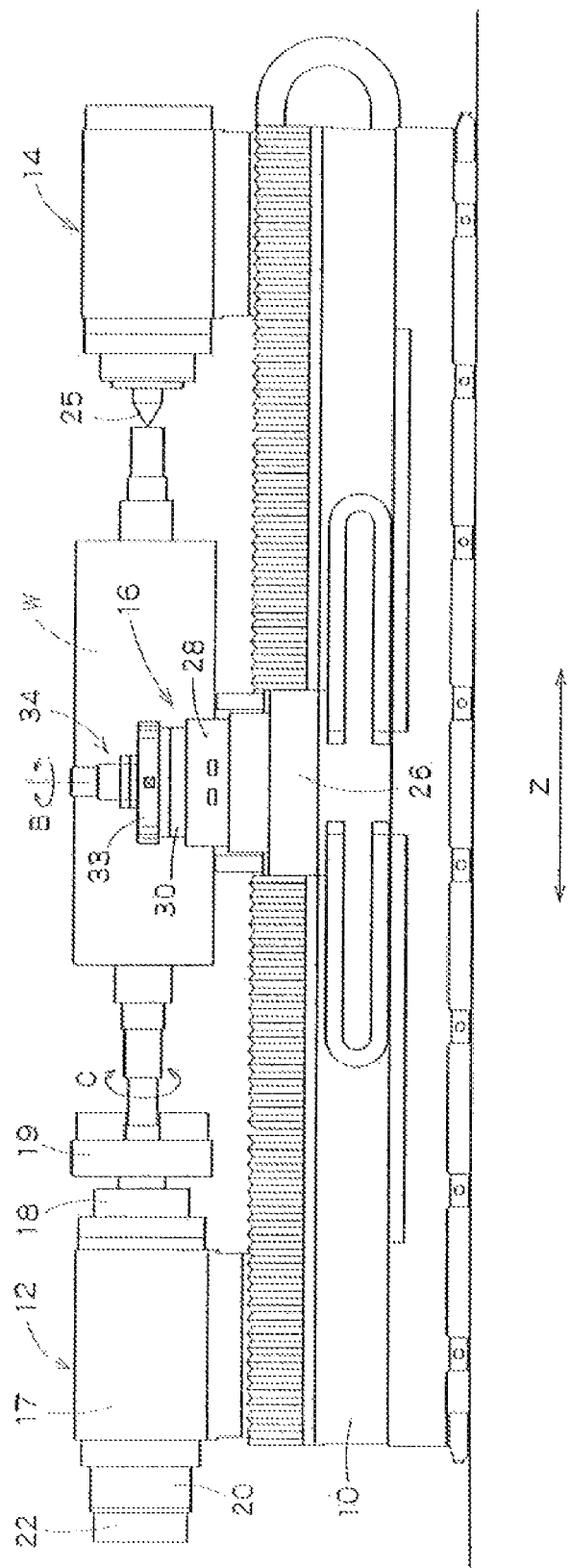
FIG. 1 is a side view of a precision roll turning lathe according to an embodiment of the present invention.
Figure 2:
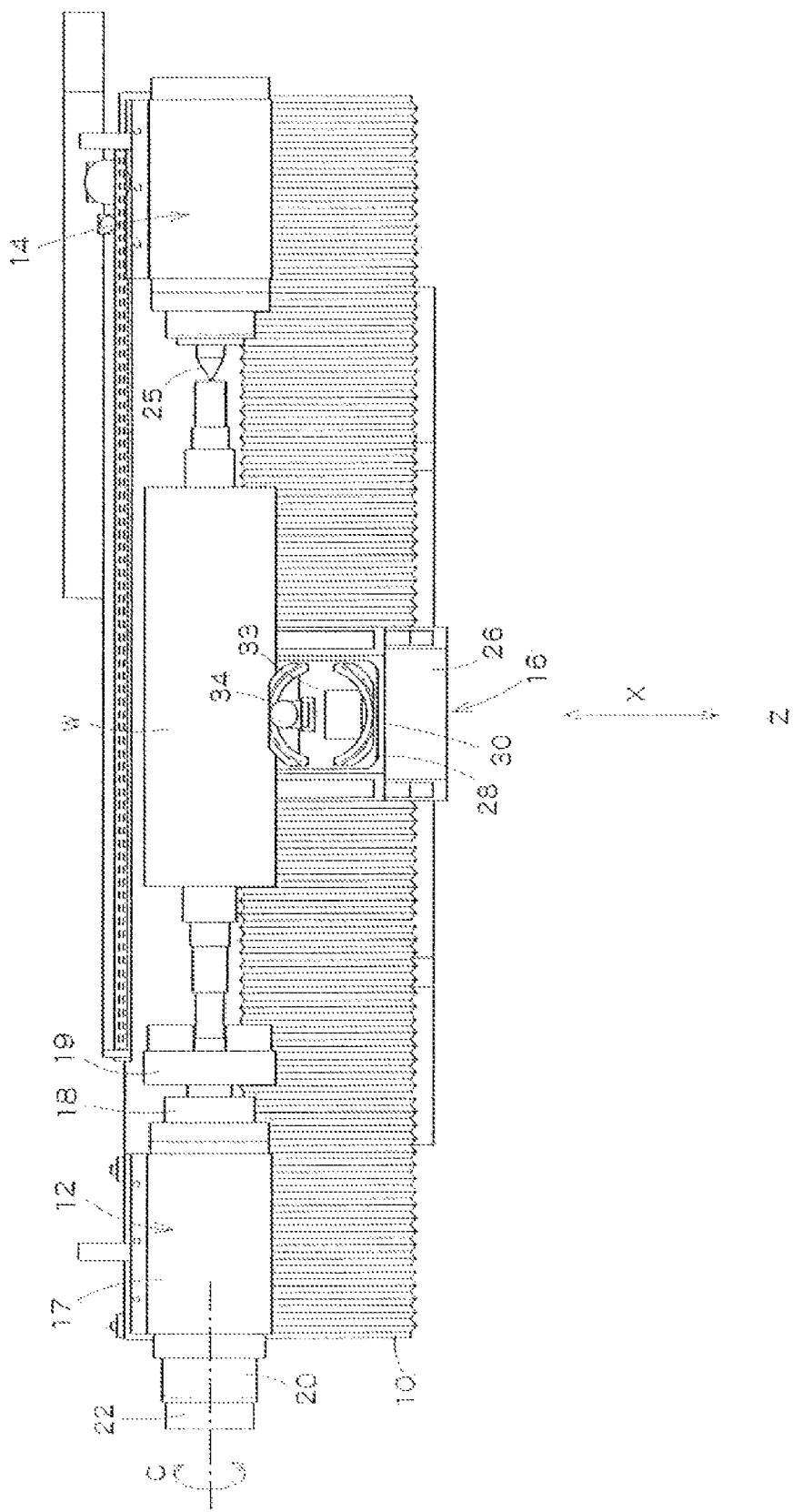
FIG. 2 is a plan view of the precision roll turning lathe.

FIG. 1 is a side view of a precision roll turning lathe according to the present invention, and FIG. 2 is a plan view of the precision roll turning lathe.

In FIGS. 1 and 2, the reference numeral 10 denotes a bed. On the bed 10 are mounted a headstock 12, a tail stock 14 and a carriage 16. A workpiece W is rotatably supported by the headstock 12 and the tail stock 14. As illustrated in FIGS. 1 and 2, the workpiece W can have a substantially cylindrical shape, such as that of a roll, for example.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is supported by a hydrostatic bearing (not shown) provided within the body 17. The chuck 19 clamps a spindle of the workpiece W and transmits the rotation of the main spindle 19 to the workpiece W. In the headstock 12, the servo motor 20 drives the main spindle 18 in order to rotate the workpiece W at a high speed. In addition, the revolution of the servo motor 20 is detected with an encoder 22 and the revolution of the servo motor 20 is controlled, so that the headstock 12 can also function as an indexing axis (C axis) for performing circumferential indexing of the workpiece W. Instead of the hydrostatic bearing supporting the main spindle 18, an air bearing or a ball bearing may also be used.

The tail stock 14 is disposed opposite the headstock 12 on the other longitudinal end of the bed 10. A guide surface (not shown) is provided on the upper surface of the bed 10 so that the tail stock 14 can be moved along the guide surface. The tail stock 14 rotatably supports with a center 25 a spindle of the workpiece W. The tail spindle of the tail stock 14, to which the center 25 is attached, is supported by a ball bearing. Though in this embodiment the workpiece W is supported by the headstock 12 and the tail stock 14, it is also possible to use, instead of the tail stock 14, a supporting mechanism having no motor and comprising a bearing and a chuck.

A description will now be given of the carriage 16.

The carriage 16 includes a saddle 26 mounted on the bed 10 movably in the axial direction of the workpiece W. On the saddle 26 is mounted a table 28 movably in a direction perpendicular to the axial direction of the workpiece W. In the precision roll turning lathe of this embodiment, the axis along which the saddle 26 is fed is termed Z axis, and the axis along which the table 28 is fed on the saddle 26 is termed X axis. In addition to the X axis and the Z axis, the headstock 12 has the C axis and a tool swivel 30, mounted on the table 28, has a B axis. The precision roll turning lathe thus is a four-axis control machine tool.

Figure 3:
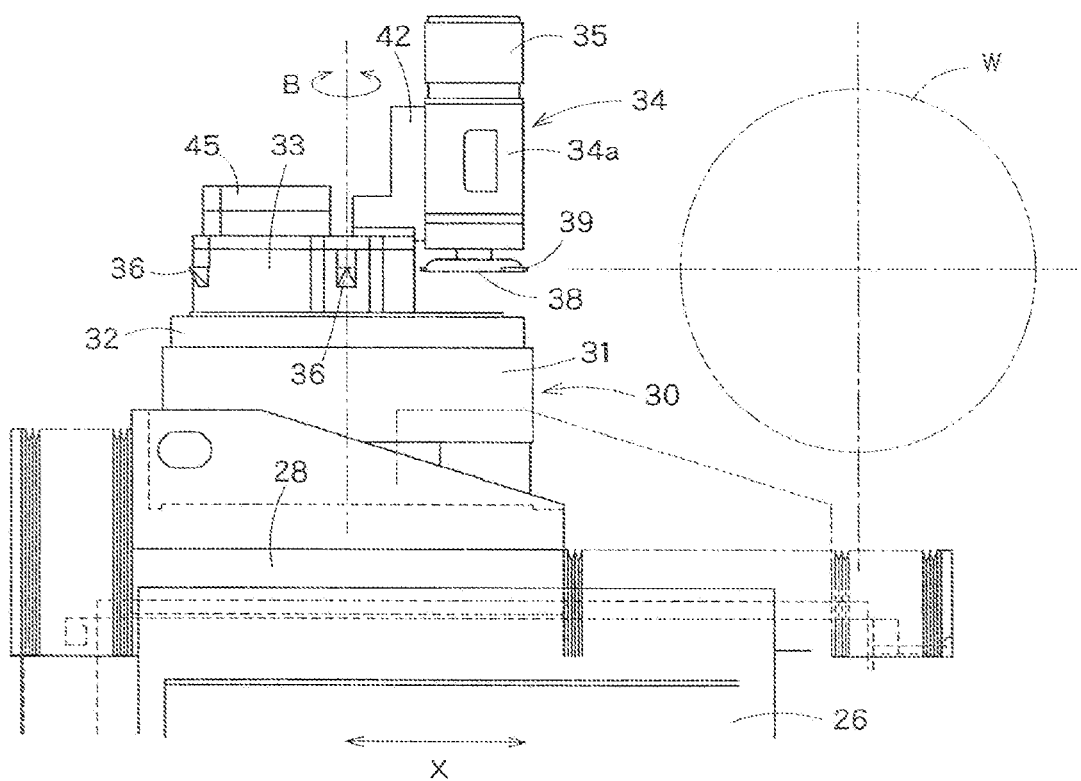
FIG. 3 is a front view of a toll swivel provided in the carriage of the precision roll turning lathe.
Figure 4:
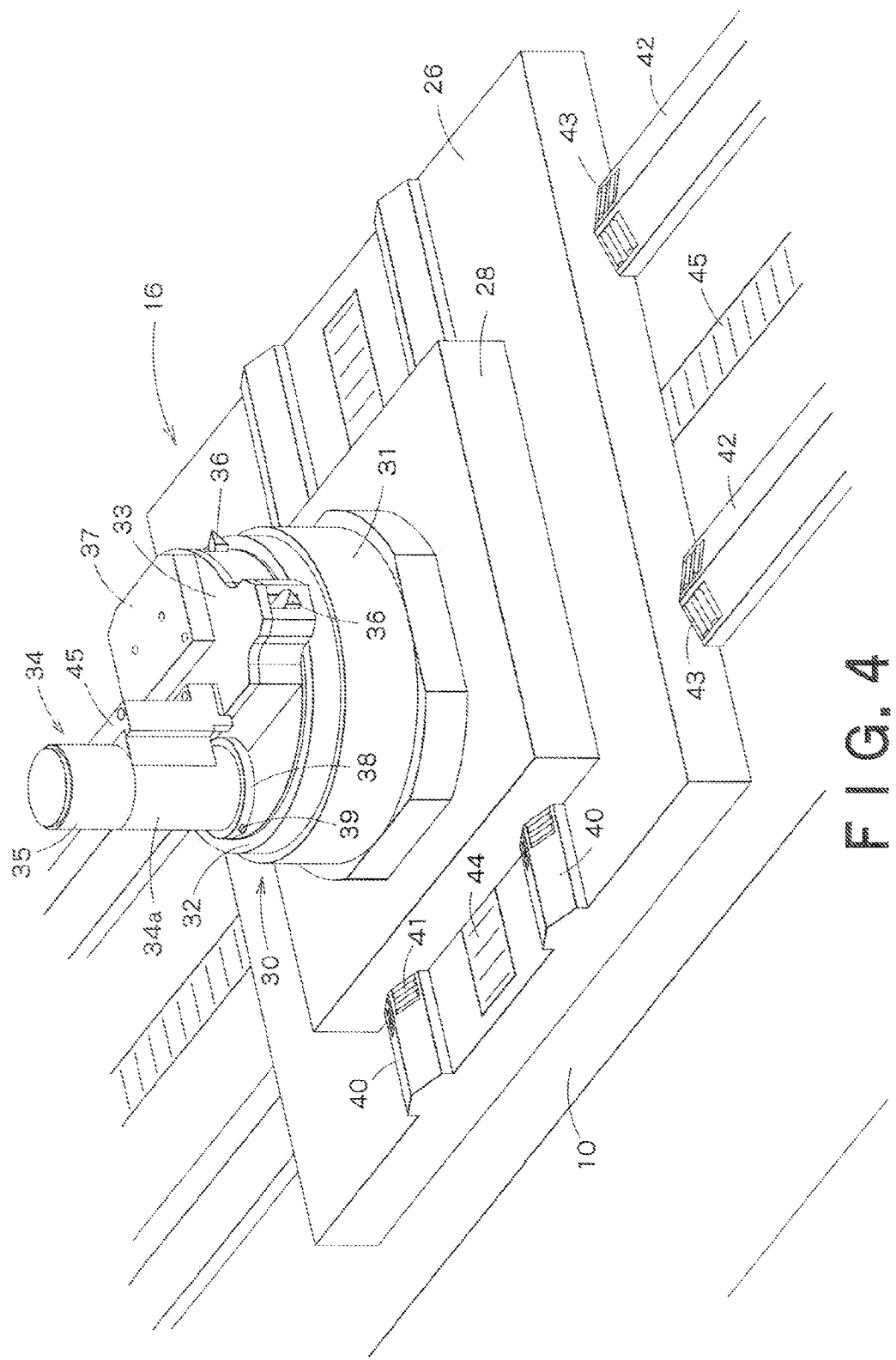
FIG. 4 is a perspective view of the tool swivel.

FIG. 3 shows the tool swivel 30. FIG. 4 is a diagram showing the tool swivel 30, with covers being removed from the bed 10 and the saddle 26. The tool swivel 30 according to this embodiment includes a swivel body 31 and a top board 32. On the top board 32 are mounted a tool post 33 having a plurality of cutting tools attached thereto, and a fly cutter spindle device 34.

The swivel body 31 has in its interior a built-in servo motor which functions as a B axis for indexing of a cutting tool of the tool post 33 or the fly cutter of the fly cutter spindle device 34. A shaft that supports the top board 32 is driven by the servo motor, so that the top board 32 can be swiveled.

The tool post 33 is mounted on one side of the top board 32, and the fly cutter spindle device 34 is disposed at a position on the other side of the top board 32. The fly cutter spindle device 34 is supported by a bracket 45 secured to the tool post 33. The tool post 33 is a tool post generally in a half-column shape, having diamond tools 36 arranged circumferentially at predetermined intervals. In this embodiment, four diamond tools 36 are provided in the tool post 33, and each tool 36 can be indexed by swiveling the tool post 33 by 60 degrees together with the top board 32. The number of the diamond tools 36 is, of course, not limited to four. For example, it is possible to provide three diamond tools and index each tool by swiveling the tool post by 90 degrees. A counter weight 37 for balancing the weight of the tool post 33 with the weight of the fly cutter spindle device 34 is placed on the upper surface of the tool post 33.

The fly cutter spindle device 34 will now be described. As shown in FIG. 4, the fly cutter spindle device 34 includes a body 34a, a motor 35, and a cutter holder 38 having a fly cutter 39 attached thereto. A spindle (not shown) is supported by an air bearing in the interior of the body 34a. The cutter spindle is directly driven by the motor 35 and rotates at a high speed. The cutter holder 38, mounted to the front end of the cutter spindle, is disk-shaped so as to increase the circumferential speed. The fly cutter 39, comprised of a diamond tool, is held on the peripheral surface of the cutter holder 38. In this embodiment the fly cutter spindle device 34 supports the spindle in a position perpendicular to the X-axis direction and to the Z-axis direction, and rotates the fly cutter 39 at a high speed in the X-Z plane. The cutting edges of the diamond tools 36, mounted in the tool post 33, lie in the same X-Z plane in which the fly cutter 39 rotates.

As shown in FIG. 4, a pair of X-axis guides 40, each having the shape of a V-shaped rib, extends on the upper surface of the saddle 26. Each X-axis guide 40 has a guide surface in which a large number of rollers 41, held by a retainer, are arranged. The table 28 of the carriage 16 is thus guided by the X-axis guides 40. Similarly, the saddle 26 of the carriage 16 is guided by a pair of Z-axis guides 42 extending on the upper surface of the bed 10. The Z-axis guide 42 likewise has a guide surface in which rollers 43 are arranged.

A Z-axis feed drive device for feeding the saddle 26 and an X-axis feed drive device for feeding the table 28 on which the tool swivel 30 is mounted are each comprised of a linear motor. Reference numeral 44 denotes a permanent magnet series which constitute the linear motor of the X-axis feed mechanism, and 45 denotes a permanent magnet series that extend parallel to the Z-axis guides 42.

The operation of the precision roll turning lathe of this embodiment, having the above construction, will now be described.

A description is first made of the function of the tool swivel 30 provided in the carriage 16.

By providing the fly cutter spindle device 34 having the fly cutter 39, as well as the tool post 33 having the diamond tools 36, both mounted on the tool swivel 30, it becomes possible, by using the B-axis indexing function, to selectively use both the tool post 33 and the fly cutter spindle device 34 to carry out composite machining.

The fly cutter spindle device 34 has a compact structure, and with the motor 35 and the air bearing, the fly cutter spindle device 34 can form a unit that can be easily mounted to the tool post 33. The use of the counter weight 37 for balancing the weight of the tool post 33 with the weight of the fly cutter spindle device 34 can prevent an error upon B-axis indexing of a tool of the tool post 33.

By selectively using the tool post 33 and the fly cutter spindle device 34 on the tool swivel 30 in the manner described below, the workpiece W can be machined with high precision not only to produce transverse grooves (circumferential grooves) but to produce longitudinal grooves (axial grooves) as well.

Machining of transverse grooves on the workpiece W will aye described first.

Machining of transverse grooves is carried out in a manner as usually carried out by a conventional common roll turning lathe. In particular, one of the diamond tools 36 of the tool post 33 is indexed by swiveling the tool swivel 33 about the B axis. While rotating the workpiece W by means of the servo motor 20 of the headstock 12, the table 28 is fed in the X-axis direction so as to cut the peripheral surface of the workpiece W with the diamond tool 36, thereby machining a transverse groove.

Figure 5:
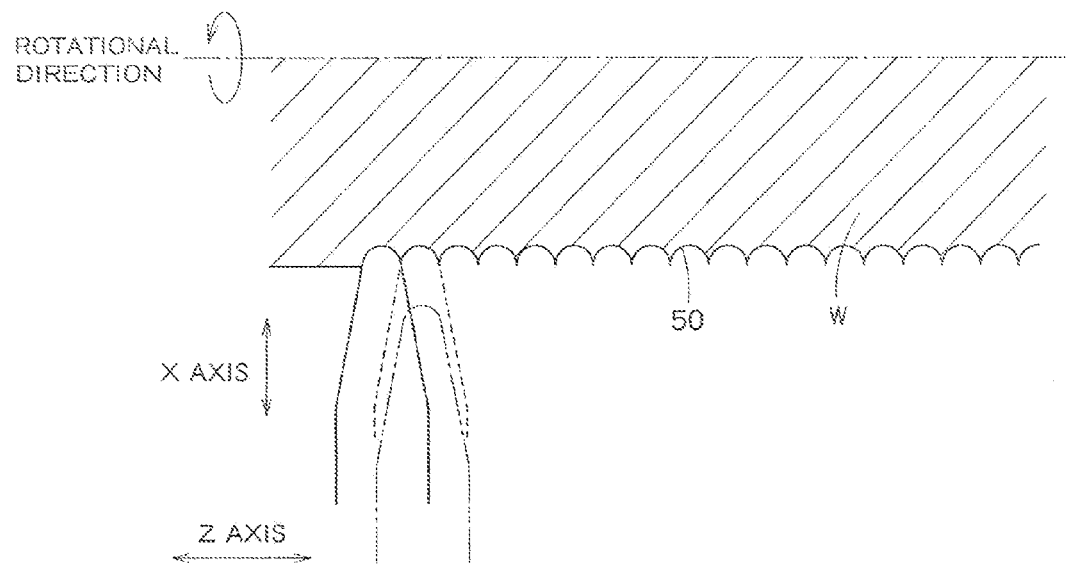
FIG. 5 is a diagram illustrating machining of transverse grooves on a roll by means of the precision roll turning lathe of the present invention.

When machining transverse grooves 50 in for example, a roll for molding of a lenticular lens, the diamond tool 36 is fed in the Z-axis direction by a distance, which is equal to a groove width, for machining of each groove 50 as shown in FIG. 5.

When machining longitudinal grooves, on the other hand, the fly cutter spindle device 34 is indexed by swiveling the tool swivel 33 about the B axis so that the cutter holder 38 of the fly cutter spindle device 34 faces the workpiece W as shown in FIG. 3. On the other hand, a circumferential position of the workpiece W, at which a longitudinal groove is to be machined, is indexed by rotating the workpiece W about the C axis of the headstock 12.

Figure 6:
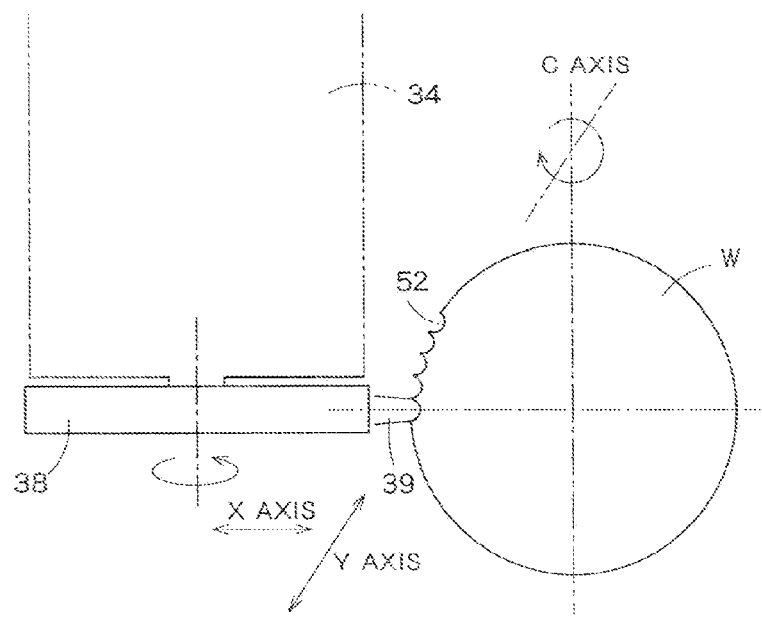
FIG. 6 is a diagram illustrating machining of longitudinal grooves on a roll by means of the precision roll turning lathe of the present invention.

The servo motor 35 of the fly cutter spindle device 34 is actuated to rotate the cutter holder 38 at a high speed, and the fly cutter 39 is fed in the X-axis direction to cut the peripheral surface of the workpiece W as shown in FIG. 6. While maintaining the high-speed rotation, the fly cutter 39 is then fed in the Z-axis direction, thereby machining a longitudinal groove 52. Longitudinal grooved 52 can be produced in the workpiece W by sequentially repeating the indexing and cutting operations.

The high-speed rotation of the fly cutter spindle device 34 can provide a desirable cutting speed (e.g. about 300 m/min) to the fly cutter 39. Longitudinal grooves can thus be machined at a desired high cutting speed irrespective of the Z-axis feed speed which is limited by the performance of the carriage 16. The roll turning lathe of the present invention thus solves the prior art problem of failing to provide precision-machined longitudinal grooves due to insufficient cutting speed associated with the limited feed speed of the carriage 16.

Further, in clear contrast with conventional roll turning lathes which are required to use the highest possible Z-axis feed speed, the present roll turning lathe can use a relative low Z-axis feed speed of the carriage 16, thus reducing generation of heat in the Z-axis rolling guide surface. This makes it possible to prevent the lowering of machining precision due to thermal deformation of the bed 10 or the saddle 26 while making use of the kinematic performance of the rolling guide.

The precision roll turning lathe of this embodiment, which can machine either longitudinal grooves or transverse grooves with high precision as described above, enables such a workpiece machining as machining longitudinal grooves and transverse grooving both with high precision in the same workpiece. For example, the present roll turning lathe enables high-precision machining of molds for molding of various types of lens sheets, such as a cross lenticular lens sheet, or a prism sheet, for example.

Besides the above-described manner of machining longitudinal grooves, it is also possible with the precision roll turning lathe of this embodiment to machine longitudinal grooves on the workpiece W with a diamond tool 36 of the tool post 33 while feeding the carriage 16 in the Z-axis direction.

What is claimed is:

1. A precision roll turning lathe comprising:
   a bed;
   a headstock, mounted on the bed, the headstock being configured to rotate a cylindrical workpiece while holding one end of the cylindrical workpiece by means of a chuck, said headstock having an indexing axis (C axis) about which said headstock performs circumferential indexing of the cylindrical workpiece;
   a tail stock, mounted on the bed and disposed opposite the headstock, for rotatably supporting the other end of the cylindrical workpiece;
   a carriage including a saddle mounted on the bed movably in the longitudinal direction (Z-axis direction) of the cylindrical workpiece, and a table mounted on the saddle movably in a direction (X-axis direction) perpendicular to the longitudinal direction of the cylindrical workpiece;
   a tool swivel mounted on the table and having an indexing axis (B axis);
   a tool post mounted on the tool swivel and having a plurality of turning lathe cutting tools attached thereto that are adapted to produce transverse grooves in the cylindrical workpiece; and
   a fly cutter spindle device mounted to the tool post and having a spindle for rotating a fly cutter that is adapted to produce longitudinal grooves in the cylindrical workpiece.

2. The precision roll turning lathe according to claim 1, wherein the fly cutter spindle device includes a disk-shaped cutter holder holding only a diamond tool on its peripheral surface, a body having in its interior an air bearing supporting the spindle, and a motor for directly driving the spindle.

3. The precision roll turning lathe according to claim 2, wherein the fly cutter spindle device rotates the fly cutter in the X-Z plane lying at the same height as the turning lathe cutting tools of the tool post.

4. The precision roll turning lathe according to claim 1, wherein the tool post has a tool post body generally in a half-column shape, and the turning lathe cutting tools are attached to the tool post body circumferentially at predetermined intervals.

5. The precision roll turning lathe according to claim 4, wherein a counter weight is placed on the tool post so as to balance the weight of the tool post with the weight of the fly cutter spindle device.

6. The precision roll turning lathe according to claim 1 further comprising a Z-axis rolling guide for guiding the feed of the carriage, said guide extending on the bed parallel to the Z axis and having a guide surface in which a large number of rollers are arranged.

7. The precision roll turning lathe according to claim 1 further comprising an X-axis feed drive device and a Z-axis feed drive device, each comprised of a linear motor.

8. The precision roll turning lathe according to claim 1, wherein the tool swivel is configured to rotate about the indexing axis (axis B) to select a turning lathe cutting tool from the plurality of turning lathe cutting tools or the fly cutter.

* * * * *